Dec. 6, 1932.  K. KLINCKMULLER  1,890,119
OIL BURNER CONTROL SYSTEM
Filed June 22, 1931
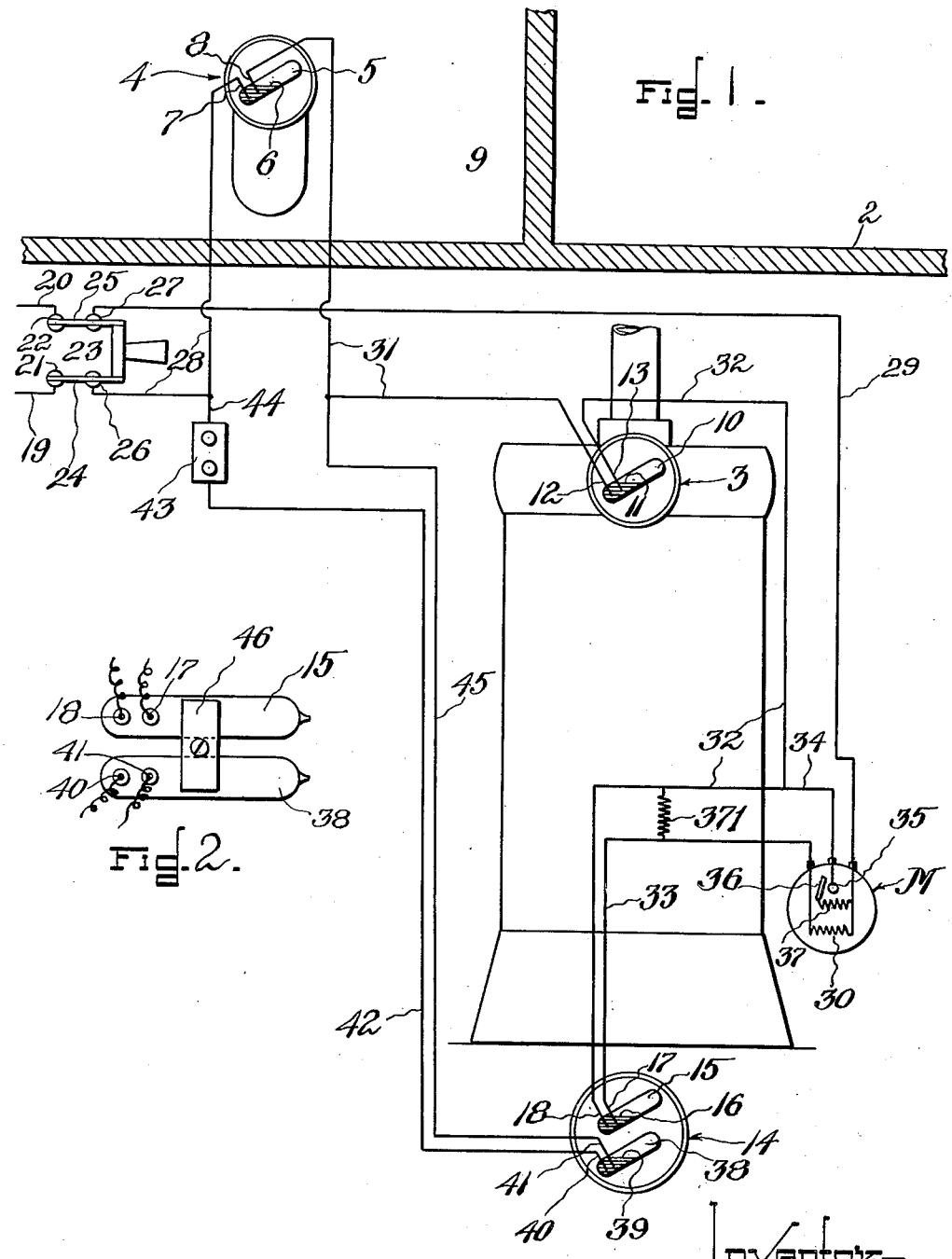

Patented Dec. 6, 1932

1,890,119

UNITED STATES PATENT OFFICE

KARL KLINCKMULLER, OF BOSTON, MASSACHUSETTS

OIL BURNER CONTROL SYSTEM

Application filed June 22, 1931. Serial No. 545,911.

My invention relates to electrical oil burner control systems and more especially to systems of this class such as are incorporated in steam and hot water heating apparatus for dwellings and other buildings.

Heating apparatus of the kind indicated are provided with an electrical controlling mechanism for the burner including a thermostat circuit-controlling switch located within one of the rooms of the building; a pressurestat circuit-controlling switch connected with the boiler; and a thermostat circuit-controlling switch that is operated by the heat generated by the burner. Heretofore these three elements have been arranged in series in a circuit with the motor or other electrically operated instrument of the oil burner, and therefore it frequently happened that shortly after the heating system was started the room thermostat would automatically open and thereby stop the operation of the burner before the radiators within other rooms of the building, which were more distant from the boiler than that within which the thermostat was located, were filled with steam or hot water.

To obviate this objectionable feature characterizing some heating systems as heretofore constructed I have provided means for rendering the opening of the room thermostat ineffective to stop the burner so that the latter will thereafter continue in operation until the circuit within which said burner is disposed is opened by the pressurestat switch, said means being controlled by the heat of the burner so that when the latter is shut down the said means is, in turn, rendered ineffective with the result that when the room thermostat automatically closes again the burner will, under normal operating conditions, be started in operation.

In the preferred form of my invention the means for rendering the room thermostat ineffective to stop the oil burner when said thermostat automatically opens consists of a shunt circuit around said room thermostat within which is arranged a thermostat switch which is automatically closed by the heat generated by the burner and automatically opened when the operation of the burner is discontinued. Also, in the preferred form of my invention, I may provide a manually operated switch, in the shunt circuit just referred to, adapted to be set in either open or closed position.

In the accompanying drawing:

Figure 1 is a diagrammatic view illustrating an embodiment of my invention.

Figure 2 is a detail hereinafter described.

Referring to the drawing 1 represents the boiler of a heating system for a building, a portion of the latter being shown in section at 2. The boiler 1 is provided with an oil burner including a motor M which may be constructed, as usual, with a starting coil 37 and a running coil 30. At 3 is shown a pressurestat switch that is connected with the steam space of boiler 1, while at 4 is shown a room thermostat switch.

The room thermostat switch 4 is of ordinary construction and comprises a glass tube 5 holding a body of mercury 6 and provided with a pair of terminals 7 and 8 which when submerged in the mercury 6 are electrically connected. The tube 5 is automatically tilted as usual by the thermostatic element of said switch 4 as the temperature within the room 9 varies. When it is tilted in one direction the terminals 7 and 8 are submerged in the mercury 6 and when tilted in the opposite direction, said terminals are disconnected.

The pressurestat 3 is likewise constructed with a glass tube 10 that is automatically tilted as usual by variations of the pressure within the boiler 1. Tube 10 contains a body of mercury 11 to co-operate with a pair of terminals 12 and 13 carried by the tube.

At 14 is shown a second thermostat switch which is controlled and operated by the heat generated by the oil burner and this switch 14 includes a glass tube 15 holding a body of mercury 16 which co-operates with a pair of terminals 17 and 18 carried by tube 15. The heat of the oil burner operates to tilt the tube 15 in a direction to electrically connect the terminals 17 and 18 while an excess pressure within the boiler 1 operates to tilt the tube 10 of pressurestat switch 3 in a direction to disconnect the terminals 12 and 13.

At 19 and 20 are shown a pair of current supplying wires or conductors, the wire 20 being the neutral wire and the wire 19 the live wire.

The wires 19 and 20 are connected with posts 21 and 22, respectively, forming part of a manual switch 23 made with a pair of blades 24 and 25 pivotally connected with said posts 21 and 22. The blades 24 and 25 co-operate with socket posts 26 and 27, post 26 being connected by a wire 28 with the terminal 7 of the room thermostat switch 4 and the post 27 being connected by a wire 29 with one end of the running coil 30 of motor M.

The other terminal 8 of room thermostat switch 4 is connected by a wire 31 with the terminal 12 of the boiler pressurestat switch 3 while the terminal 13 of the latter is connected by a wire 32 with the terminal 18 of tube 15. The other terminal 17 of tube 15 is connected by a wire 33 with the opposite end of the running coil 30 of motor M.

The wire 32 has connected with it one end of a wire 34 whose opposite end is connected with a fixed contact 35 that is co-operatively disposed with relation to a movable contact 36. This movable contact 36 is connected with one end of a starting coil 37 whose opposite end is connected with the neutral wire 29. The contacts 35 and 36 are part of the usual centrifugal switch of motor M which is held open by centrifugal force when motor M is operating at full speed, and which closes automatically when motor M is stopped.

Systems of the type described above are provided with a resistor 371 whereof one end is connected with the wire 32 and the opposite end with the wire 33. It is not necessary for an understanding of my invention to illustrate the other parts that are associated with this resistor in a system of this type.

When the heating system is to be started the room thermostat switch 4 and the boiler pressurestat switch 3 occupy closed positions and the burner thermostat switch tube 15 is horizontal and terminals 17 and 18 are disconnected. Therefore, when switch 23 is closed a circuit is completed through motor M which is traced as follows: From switch 23, through wire 28, switch 4, wire 31, switch 3, wires 32 and 34, switch 35—36, starting coil 37 and wire 29 back to switch 23. The burner being thus started soon generates sufficient heat to tilt tube 15 in a direction to connect terminals 17 and 18 and the rotation of the movable parts of motor M causes centrifugal force to open the switch 35—36 so that thereafter, while the heating system is in operation, the starting coil 37 is cut out and the circuit of the motor is through wire 32, switch 15—16—17—18, wire 33 and running coil 30 to the neutral wire 29.

The above described construction and operation is as heretofore.

To obtain the objects of my invention I have herein shown a shunt circuit around the room thermostat switch 4 in which is arranged a second burner thermostat switch including a glass tube 38 containing a body of mercury 39 which co-operates with a pair of terminals 40 and 41 carried by said tube 38. The terminal 40 is connected by a wire 42 with one binding post of a make-and-break manually operated push-button switch 43 whose other binding post is connected by a wire 44 with the wire 28. The other terminal 41 is connected by a wire 45 with the wire 31.

The switch 43 may be of the push button type provided with two push buttons as shown, operation of one of which closes the switch while operation of the other button opens the same.

I have found it convenient to incorporate the supplemental tube 38 in the system by fastening the same to the usual tube 15 by means of a clip or clamp 46, Fig. 2, so that the two tube are parallel and directly opposite each other. It will thus be clear that when the burner thermostat switch 14 operates automatically to connect the terminals 17 and 18, it will simultaneously connect the terminals 40 and 41. So also, the terminals 40 and 41 are disconnected at the same time that the terminals 17 and 18 are disconnected.

The boiler pressurestat switch 3 is adjusted to open after the room thermostat switch 4 and it will therefore be clear that if switch 43 is closed when room thermostat switch 4 opens, the circuit of the motor M will thereafter be maintained through the shunt 42—45 until the boiler pressurestat switch 3 opens.

In this way sufficient pressure is built up within boiler 1, when the system is started, to force the steam or hot water into radiators which are located in distant rooms that are farther from the boiler than the room 9 within which the thermostat switch 4 is located. Obviously the shunt 42—45 may be rendered inoperative when desired by opening switch 43 after which the system will operate as heretofore.

What I claim is:—

1. In an apparatus of the character described, the combination with a boiler provided with an oil burner, of an electrical control system for said burner including an electrically operated burner-regulating element; a circuit in which said burner-regulating element is arranged; a room thermostat switch for operating said circuit; means for checking the operation of said burner when the pressure within said boiler rises to a predetermined point; a shunt circuit around said room thermostat switch; and a burner-controlled thermostat switch in said shunt circuit that is automatically maintained closed while said burner is in operation and which is automatically opened when the operation of said burner is checked.

2. In an apparatus of the character described the combination of a boiler provided with an oil burner including an electrically operated burner regulating element, a circuit within which said burner regulating element is arranged; a pressurestat for controlling said circuit and element to check the operation of said burner when the pressure within said boiler rises to a predetermined point; a thermostat switch in said circuit that is controlled by the heat of said burner so that it is maintained closed while said burner is in operation, and is automatically opened when the operation of said burner is stopped; a room thermostat switch for operating said circuit; a second thermostat switch that is controlled by the heat of said burner so that it is maintained closed while said burner is in operation and is automatically opened when said burner is stopped; a shunt in said circuit extending around said room thermostat within which said second thermostat switch is arranged, and means by which to manually open and close said shunt.

Signed by me at Boston, Suffolk county, Massachusetts, this 20th day of June, 1931.

KARL KLINCKMULLER.